(12) United States Patent
Desjardins et al.

(10) Patent No.: US 10,927,944 B2
(45) Date of Patent: Feb. 23, 2021

(54) COMPACT, TWIST CONTROLLED PLANET CARRIER AND EPICYCLIC GEAR TRAIN HAVING SAME

(71) Applicant: PRATT & WHITNEY CANADA CORP., Longueuil (CA)

(72) Inventors: Michel Desjardins, St-Hubert (CA); Louis Brillon, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 310 days.

(21) Appl. No.: 15/881,185

(22) Filed: Jan. 26, 2018

(65) Prior Publication Data
US 2019/0234509 A1    Aug. 1, 2019

(51) Int. Cl.
*F16H 57/08*    (2006.01)
*F16H 1/28*    (2006.01)
*F16H 57/04*    (2010.01)
*F02C 7/36*    (2006.01)

(52) U.S. Cl.
CPC ............. *F16H 57/082* (2013.01); *F16H 1/28* (2013.01); *F02C 7/36* (2013.01); *F05D 2260/40311* (2013.01); *F16H 57/0471* (2013.01); *F16H 57/0479* (2013.01)

(58) Field of Classification Search
CPC ...... F16H 57/082; F16H 1/28; F16H 57/0479; F16H 57/0471; F16H 2001/2881; F05D 2260/40311; F02C 7/36
See application file for complete search history.

(56) References Cited

U.S. PATENT DOCUMENTS

| 3,257,869 A | 6/1966 | Sharples |
| 3,527,121 A | 9/1970 | Moore |
| 3,635,103 A | 1/1972 | Monti |

(Continued)

FOREIGN PATENT DOCUMENTS

| DE | 19706686 | 8/1998 |
| DE | 102014206977 | 10/2015 |

(Continued)

OTHER PUBLICATIONS

European Search Report dated Oct. 14, 2019 for application No. 19154905.4.

(Continued)

*Primary Examiner* — David R Morris
*Assistant Examiner* — Lillian T Nguyen
(74) *Attorney, Agent, or Firm* — Norton Rose Fulbright Canada LLP

(57) ABSTRACT

A planet carrier for an epicyclic gear train of a gas turbine engine gearbox includes a centrally disposed torque transfer coupling, a pair of carrier plates parallel to each to each other and perpendicular to a longitudinal axis, and center arms radially extending radially outward from the torque transfer coupling to the carrier plates. A central bore is concentric with the longitudinal axis and forming a torque transmission point on the planet carrier. The center arms are axially disposed between the axially spaced apart carrier plates and have radially outer ends which terminate at an outer perimeter of the carrier plates. The center arms are thus entirely radially disposed within a radial outer perimeter of the carrier plates.

20 Claims, 8 Drawing Sheets

(56) References Cited

U.S. PATENT DOCUMENTS

| | | |
|---|---|---|
| 3,654,815 A | 4/1972 | Dehne |
| 3,842,481 A | 10/1974 | Laing |
| 3,939,736 A * | 2/1976 | Morin ................... F16H 57/082 475/338 |
| 3,943,780 A | 3/1976 | Klaue |
| 4,129,050 A | 12/1978 | Akashi et al. |
| 4,271,928 A | 6/1981 | Northern |
| 4,282,776 A | 8/1981 | Eller |
| 4,329,130 A | 5/1982 | Nagata et al. |
| 4,586,401 A | 5/1986 | Nogle |
| 4,793,214 A | 12/1988 | Nurnberger et al. |
| 4,854,184 A | 8/1989 | Jessup |
| 4,856,377 A | 8/1989 | Goudreau et al. |
| 4,983,152 A | 1/1991 | Kimberlin et al. |
| 5,136,197 A | 8/1992 | Hallett |
| 5,152,726 A | 10/1992 | Putney et al. |
| 5,237,885 A | 8/1993 | Putney et al. |
| 5,309,714 A | 5/1994 | Bellman et al. |
| 5,382,203 A | 1/1995 | McKibbin et al. |
| 5,466,198 A | 11/1995 | Fan |
| 5,470,286 A | 11/1995 | Lederman |
| 5,649,254 A | 7/1997 | Mori et al. |
| 5,679,089 A | 10/1997 | Levedahl |
| 5,928,105 A | 7/1999 | Taha et al. |
| 6,148,605 A | 11/2000 | Lardellier |
| 6,394,387 B1 | 5/2002 | Mitrovic |
| 6,422,971 B1 | 7/2002 | Katou et al. |
| 6,663,530 B2 | 12/2003 | Poulin et al. |
| 6,837,819 B2 | 1/2005 | Foster |
| 6,964,155 B2 | 11/2005 | McCune et al. |
| 7,104,918 B2 | 9/2006 | Mitrovic |
| 7,223,197 B2 | 5/2007 | Poulin et al. |
| 8,491,436 B2 | 7/2013 | Duong et al. |
| 8,647,229 B2 | 2/2014 | Ai et al. |
| 8,827,863 B2 | 9/2014 | Poon et al. |
| 8,840,508 B2 | 9/2014 | Floren et al. |
| 9,079,317 B2 | 8/2015 | Ai et al. |
| 9,523,424 B2 | 12/2016 | Altamura |
| 9,702,451 B2 | 7/2017 | Gravina |
| 9,803,742 B1 | 10/2017 | Raju et al. |
| 9,874,150 B2 | 1/2018 | McCune et al. |
| 2003/0008748 A1 | 1/2003 | Fox |
| 2003/0114267 A1 | 6/2003 | Poulin et al. |
| 2003/0162630 A1 * | 8/2003 | Poulin .................... F02C 7/36 475/331 |
| 2005/0070396 A1 | 3/2005 | Christ |
| 2010/0056321 A1 | 3/2010 | Snyder et al. |
| 2011/0105270 A1 * | 5/2011 | Matsuoka ................ F02C 7/36 475/331 |
| 2011/0212808 A1 | 9/2011 | Pabst |
| 2012/0028756 A1 | 2/2012 | Lopez et al. |
| 2013/0035194 A1 | 2/2013 | Ai et al. |
| 2015/0065285 A1 | 3/2015 | McCune et al. |
| 2016/0097330 A1 | 4/2016 | Venter |
| 2016/0238126 A1 | 8/2016 | Beck et al. |
| 2016/0363211 A1 | 12/2016 | Bradley |
| 2018/0187719 A1 | 7/2018 | Tulokas |
| 2019/0234509 A1 | 8/2019 | Desjardins et al. |

FOREIGN PATENT DOCUMENTS

| | | | |
|---|---|---|---|
| DE | 102014206977 A1 * | 10/2015 | ........... F16H 57/082 |
| EP | 0229958 | 7/1987 | |
| EP | 0271416 | 6/1988 | |
| EP | 0618383 | 10/1994 | |
| EP | 0989316 | 3/2000 | |
| EP | 1028275 | 8/2000 | |
| EP | 1267095 | 12/2002 | |
| EP | 1435475 | 7/2004 | |
| EP | 2799674 | 5/2014 | |
| EP | 3000988 | 3/2016 | |
| GB | 125364 | 3/1955 | |
| GB | 725364 | 3/1955 | |
| GB | 1420965 | 1/1976 | |
| JP | 358061982 | 4/1983 | |
| JP | 358156773 | 9/1983 | |
| JP | 407332475 | 12/1995 | |
| JP | 408270739 | 10/1996 | |
| JP | 2010169226 | 8/2010 | |
| WO | 2011130352 | 10/2011 | |
| WO | 2018030177 | 2/2018 | |

OTHER PUBLICATIONS

European Search Report dated Oct. 16, 2019 for application No. 19153919.6.

\* cited by examiner

COMPACT, TWIST CONTROLLED PLANET CARRIER AND EPICYCLIC GEAR TRAIN HAVING SAME

TECHNICAL FIELD

The present disclosure relates to gearboxes for gas turbine engines and, more particularly, to an epicyclic gear train having a planet gear carrier.

BACKGROUND

Epicyclic gear trains are frequently used in reduction gearboxes of gas turbine engines. The planet carriers of such epicyclic gear trains can be prone to torsional deflection wherein the planet carrier twists around its central axis under load causing individual axis of rotation of the planet gears mounted to the planet carrier to lose parallelism with the central axis of the carrier. This can negatively affect the efficiency and life span of the gear train.

Improvement is sought to provide a more compact and lower weight planet carrier design, without sacrificing durability, thereby potentially improving the power to weight ratio of the gearbox.

SUMMARY

There is accordingly provided, in one aspect, An epicyclic gear train defining a longitudinal axis centrally extending therethrough, the epicyclic gear train comprising a central sun gear, an outer ring gear, and a number of planet gears which are mounted to a planet carrier for rotation about respective planet gear axes, the planet gears disposed in meshed engagement with the central sun gear and the outer ring gear, the planet carrier including a torque transfer coupling having a central bore concentric with the longitudinal axis and forming a torque transmission point on the planet carrier, a pair of carrier plates perpendicular to the longitudinal axis and axially spaced apart for supporting the planet gears therebetween, the planet carrier further including center arms extending radially outward from the torque transfer coupling to the carrier plates, the center arms transmitting torque between the torque transfer coupling and the carrier plates, the center arms being axially disposed between the carrier plates and having radially outer ends which terminate at an outer perimeter of the carrier plates.

In another aspect, there is provided An epicyclic gear train having a longitudinal axis centrally extending therethrough the epicyclic gear train comprising a sun gear, an outer ring gear, and a number of planet gears which are mounted to a planet carrier and disposed radially between the central sun gear and the outer ring gear in meshing engagement therewith, the planet carrier comprising a torque transfer coupling centrally disposed concentrically with the longitudinal axis and two carrier plates disposed radially outward from the torque transfer coupling, the two carrier plates being axially spaced apart from each other and connected to the torque transfer coupling by center arms, the center arms disposed axially midway between the carrier plates and radially extending away from the torque transfer coupling, the two carrier plates defining a radially outer perimeter enclosing a planar body of the carrier plates, the center arms having radially outer ends which terminate at the radially outer perimeter of the carrier plates such that the center arms are radially disposed entirely within the radially outer perimeter of the carrier plates.

In a further aspect, there is provided A planet carrier adapted for use in an epicyclic gear train of a gas turbine engine, epicyclic gear train defining a longitudinal axis centrally extending therethrough, the planet carrier comprising a torque transfer coupling centrally disposed concentrically with the longitudinal axis and carrier plates disposed radially outward from the torque transfer coupling, the carrier plates being axially spaced apart from each other and connected to the torque transfer coupling only by center arms, the center arms disposed axially between the carrier plates and radially extending away from the torque transfer coupling, the center arms having radially outer ends which terminate at a radially outer perimeter of the carrier plates such that the center arms are entirely radially disposed within the radially outer perimeter of the carrier plates.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
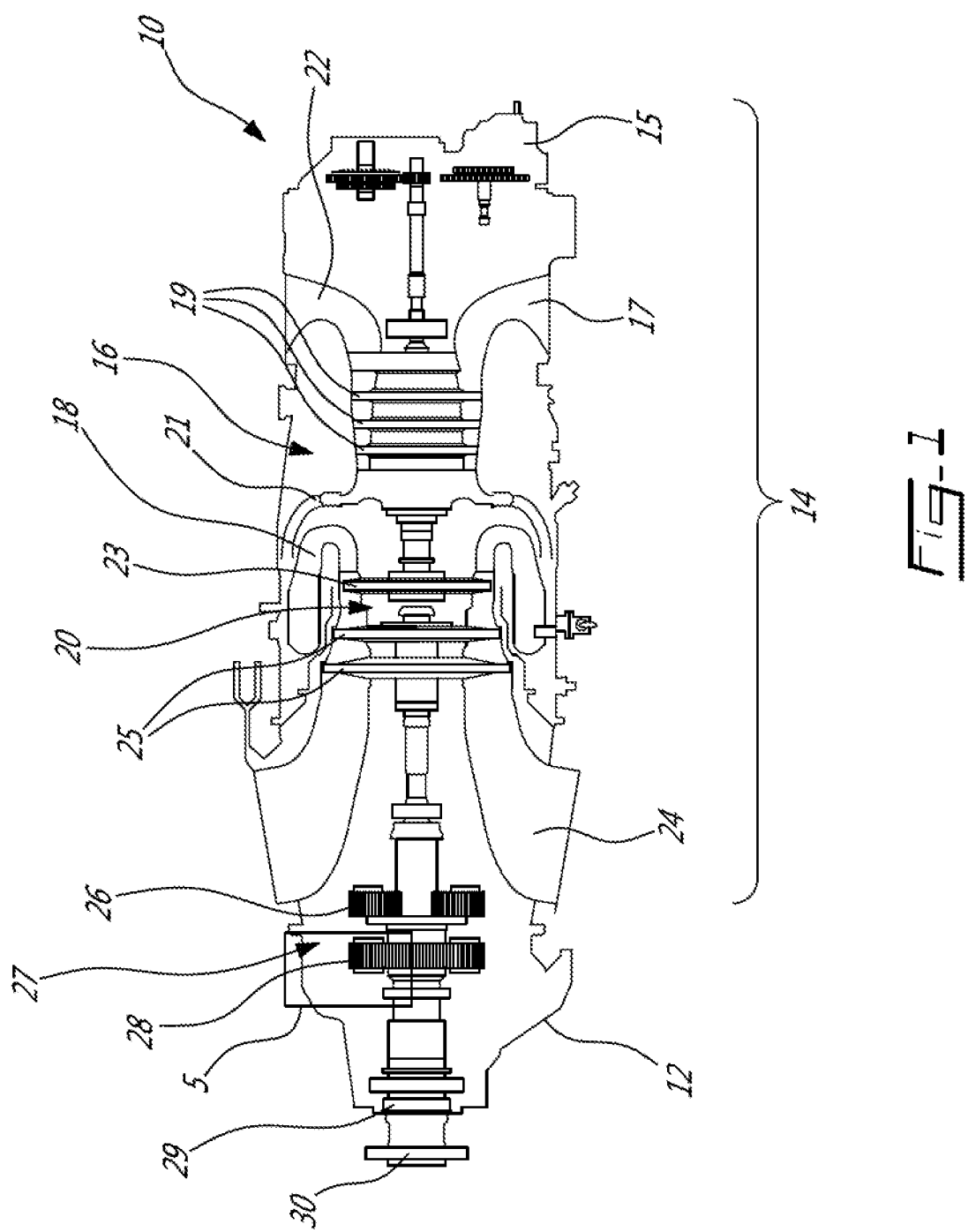
FIG. 1 is a schematic cross-sectional view of a gas turbine engine having a reduction gearbox with an epicyclic gear train.

Referring to FIG. 1, a turboprop gas turbine engine 10 generally having a power plant 14 and a reduction gearbox (RGB) 12. The engine power plant 14 includes a compressor section 16, combustion chamber 18, and a turbine section 20. Air inlets 22 permit air to be drawn into the gas generator and, following power withdrawal by the turbine section, exhaust ducts 24 provide an engine exhaust gas outlet. While the exemplary turboprop gas turbine engine 10 as depicted in FIG. 1 is of the type having an inversed configuration (i.e. air inlet towards the rear of the engine and the exhaust ducts 24 towards the front of the engine), it is to be understood that other configurations of the gas turbine engine 10, and the power plant portion 14 in particular are within the scope of the present disclosure. The reduction gearbox 12 as described herein, and more particularly the epicyclic gear train 27 thereof, can be used in conjunction with any number of gas turbine engine types and configurations, including both turboprop and turboshaft engines. Further still, the epicyclic gear train as described herein can be used in a turbofan gas turbine engine, despite it not having a full reduction gear box as in turboshafts and turboprops.

Referring to FIG. 1, the operation of such an airborne gas turbine engine 12 is well known, and occurs generally as follows, by means of example only. Air enters the engine through the inlet 17 and is compressed by the compressor section 16, in this case comprising axial flow compressors 19 and a centrifugal compressor 21. The compressed air is then fed to the combustion chamber 18 where it is mixed with fuel and ignited. The hot gas then expands through the turbine section 20, before being discharged to the atmosphere through exhaust ducts 24. The turbine section 20 in this exemplary embodiment is comprised of a compressor turbine 23 and a power turbine 25. The compressor turbine 23 drives the compressor 18 and the accessories through accessory gearbox 15. The power turbine 25, which is mechanically independent from the compressor turbine 23 and the reduction gearbox 12, ultimately drives the propeller of the engine 12 via the propeller shaft 29 at the output of the gearbox 12.

In the embodiment of FIG. 1, the exemplary reduction gearbox 12 includes an epicyclic gear train 27 having two reductions stages, namely a first reduction stage 26 that receives input from the power plant 14 through a power turbine output shaft, and a second reduction stage 28 that receives power/torque from the first reduction stage 26, thereby further reducing the rotational speed before transmitting torque to an output propeller shaft 29. The output of the second reduction stage 28 of the epicyclic gear train 27 therefore drives a propeller (not shown), which is adapted to be fastened to a propeller flange 30 disposed at the forward end of the propeller shaft 29. The gear train 27 is an epicyclic gear train, in that one or more of the reductions stages 26, 28 thereof includes an the epicyclic gear train configuration as described herein.

While different configurations for reduction gearboxes and gear trains used therein exist, the reduction gearbox 12 and the gear train 27 of the present disclosure are respectively an epicyclic gearbox and an epicyclic gear train, in that they include one or more reduction stages that comprise an epicyclic configuration. While the terms "planetary" and "epicyclic" with respect to such gear trains and gearboxes are both used in the art and are generally understood interchangeably to refer to the same type of gear train and/or gearbox, the term "epicyclic" will be used herein.

The second reduction stage 28 will generally be described herein with reference to the epicyclic gear train 27 of the present disclosure, however it is to be understand that the features of the epicyclic gear train and the planet carrier thereof as described herein can similarly be employed as part of the first (or other) reduction stage of the RGB 12. Similarly, as noted above, the epicyclic gear train configuration and the elements thereof as described herein can be employed in a turbofan gas turbine engine, despite it not comprising a full reduction gear box as in turboshafts and turboprops.

Regardless, in the depicted embodiment, the second reduction stage 28 of the epicyclic gear train 27 within the RGB 12 of the gas turbine engine 10 is an epicyclic reduction stage that generally comprises a central sun gear, an outer ring gear, and at least two (but typically three or more) planet gears supported by a planetary carrier, all of which are described in further detail below.

Figure 2:
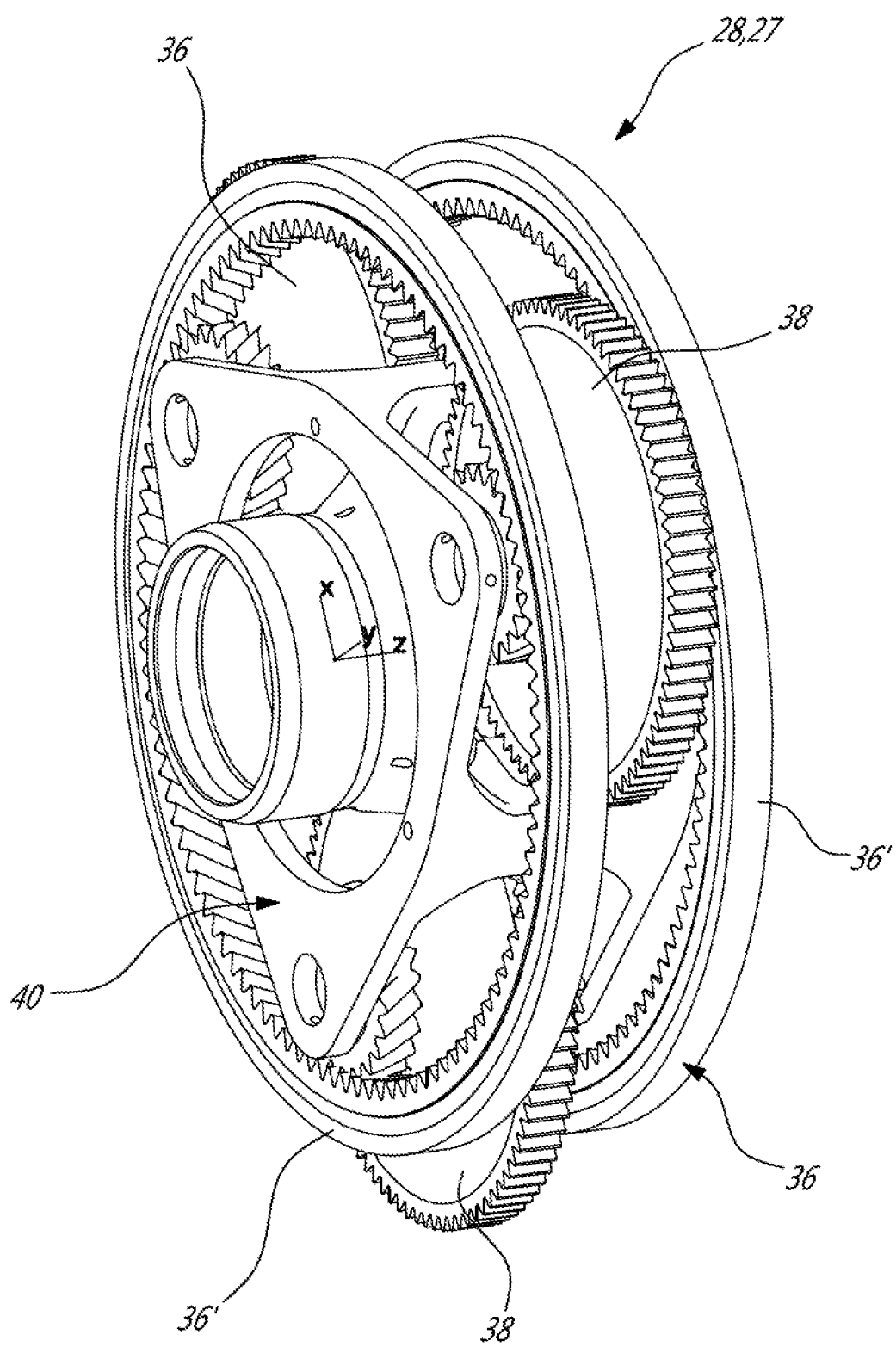
FIG. 2 is a perspective view of an epicyclic reduction stage of the epicyclic gear train of the gas turbine engine in FIG. 1, having a compact planet carrier in accordance with an embodiment of the present disclosure.
Figure 3:
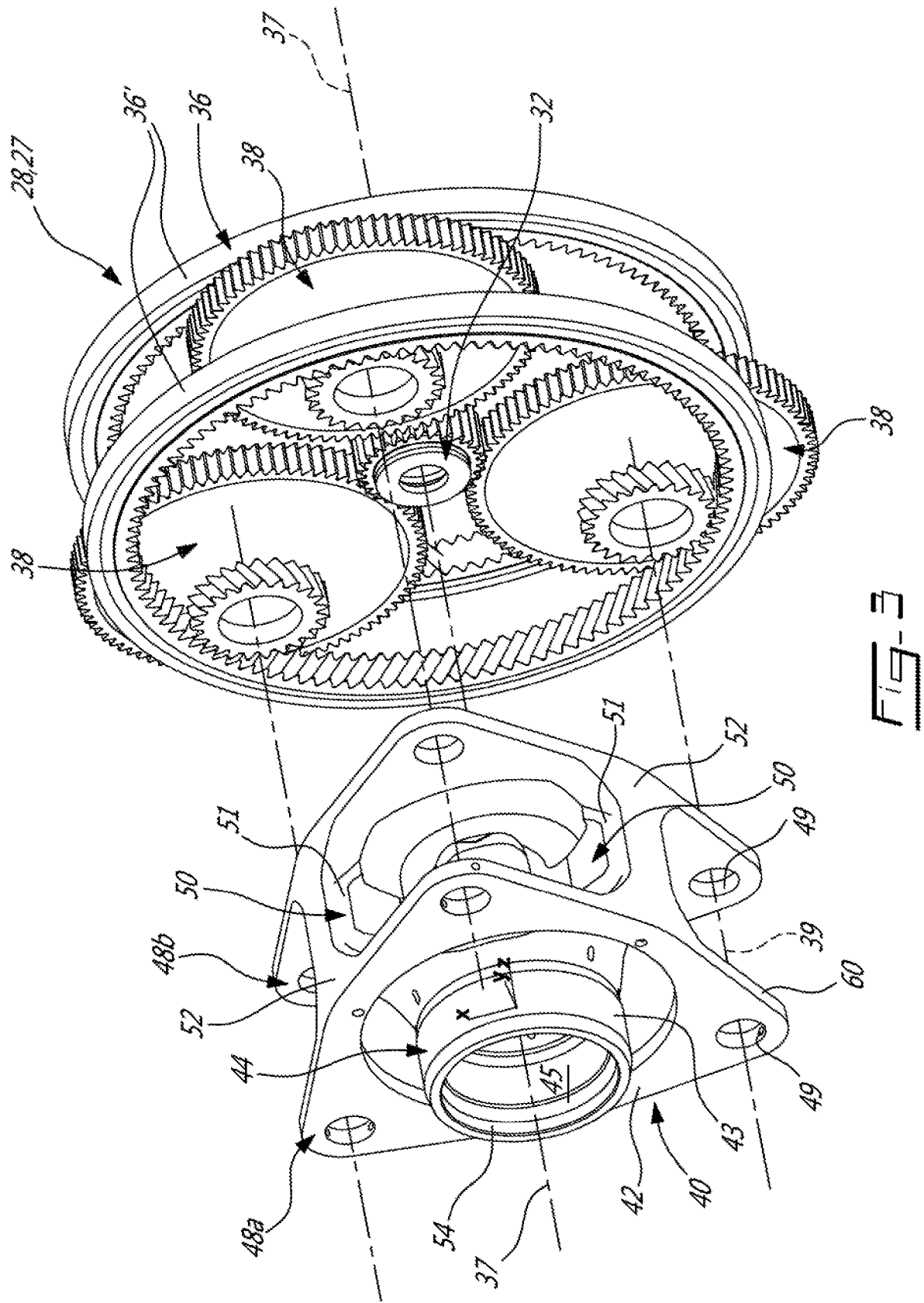
FIG. 3 is a partially exploded view of the epicyclic reduction stage of the FIG. 2 and the planet carrier thereof.

Referring now to FIGS. 2 and 3, the epicyclic reduction stage 28 of the epicyclic gear train 27 includes generally a central sun gear 32, an outer ring gear 36, and a plurality (in this case, three) of planet gears 38 which are in meshing engagement with both the sun gear 32 and the outer ring gear 36. In the depicted embodiment, the outer ring gear 36 is a split gear, in that it includes two outer ring gear portions 36' which are axially spaced apart, each meshing with axially aligned gear teeth on axially opposite sides of the planet gears 38, for better load distribution and torque transfer. The planet gears 38 are supported within the ring gear 36 by a torque-transferring planet carrier 40, which will now be described in further detail below.

As seen in FIG. 3, each planet gear 38 is rotatably mounted in the planetary carrier 40 about a planet axis 39 and is in meshing engagement with both the (radially inward) sun gear 32 and the (radially outward) ring gear 36. The sun gear 32, ring gear 36, and planet carrier 40 are all concentric about a longitudinally-extending central axis 37, and both the sun gear 32 and planet carrier 40, in operation, rotate about this longitudinal axis 37. Each planet gear 38, which is mounted to and supported by the planet carrier 40, rotates about its own individual axis of rotation 39, such that the planet gears 38 collectively rotate the planet carrier 40 about the central axis 37 when driven by the sun gear 32.

Referring now to FIG. 3-6, the planet carrier 40 will be described in greater detail. The planet carrier 40 of the present disclosure may provide a more compact arrangement which reduces the weight of the component and thus of the overall gear train 27, and consequently may result in more desirable power to weight ratio for the RGB 12. The planet carrier 40 may also provide a simplified torque path which may enable weight savings with beneficial durability and part life span improvements.

The planet carrier 40 is monolithic, in that it is integrally formed of a one-piece. The body 42 of the planet carrier 40 will therefore be said to be monolithic. The planet carrier 40 may, for example, be machined from a single piece of material, however other suitable manufacturing methods may be used to form the planet carrier 40 as a single, one-piece, component (e.g. additive manufacturing, casting, molding, etc.).

The monolithic body 42 of the present planet carrier 40 includes generally a torque transfer coupling 44, a pair of carrier plates 48a and 48b, and a number of center arms 50 interconnecting the carrier plates 48a, 48b and the torque transfer coupling 44. As will be seen, these internally positioned center arms 50, which are integrally formed with both the carrier plates 48a, 48b and the torque transfer coupling 44, may provide a more compact and simplified torque path through the carrier.

The torque transfer coupling 44 is centrally disposed within the body 42 of the planet carrier 40, concentrically with the longitudinal center axis 37. A central tubular portion 43 thereof defines a central bore 45 that axially extends at least partially therethrough, and is adapted to receive therein and matingly engage (e.g. via splines) the propeller shaft 29 providing the output from the RGB 12. A coupling end 54 of the central tubular portion 43 of the torque transfer coupling 44, which in the depicted embodiment is closest to the output end of the gear train, provides the interface with the propeller shaft 29. In the case where the planet carrier 40 forms part of a first reduction stage in a multi-stage gear train or gearbox, then the coupling end 54 of the central tubular portion 43 is configured to engage the input to the next reduction stage (such as a shaft driving a sun gear for another epicyclic reduction stage). In another gear train configuration, the coupling end 54 may provide a torque input into the planet carrier, rather than being the torque output therefrom. Regardless of the configuration, the coupling end 54 of the torque transfer coupling 44 may also be referred to herein as a torque transmission point 54 of the planet carrier 40, as the torque transmitted from (as torque output) or to (as torque input) will occur at this location of the planet carrier 40. It is to be understood that the term "point" as used in this context is not meant to define a single point (e.g. dot), but rather a location on the planet carrier (which may, for example, be formed of a surface such as the splined inner surface of the central bore 45, for example).

The carrier plates 48a and 48b of the planet carrier 40 extend radially away form the torque transfer coupling 44 and are substantially perpendicular to the central axis 37. The carrier plates 48a, 48b are axially spaced apart from each other to receive therebetween the planet gears 38, which are supported on axially opposed ends by the carrier plates 48a and 48b. A number (corresponding to the number of planet gears) of pairs of planet gear axle openings 49 are disposed in each of the carrier plates 48a, 48b, the openings 49 in opposed plates 48a and 48b being in radial and circumferential alignment with each other, concentrically disposed with, and defining, the individual axes of rotation 39 of the planet gears 38. The planet gear openings 49 and thus the planet gears 38 mounted therewithin are circumferentially equidistantly spaced about the body 42 of the planet carrier 40, and are radially disposed a common distance relative to the central axis 37.

In the embodiment depicted in FIGS. 3-6, three planet gears 38 are provided and thus the individual axes of rotation 39 thereof, as defined by the planet gear openings 49 in the carrier plates 48a, 48b, are circumferentially spaced apart by 120 degrees about the central axis 37. Each of the planet gears 38 is rotatably mounted to the carrier plates 48a, 48b by axles and/or bearings, such as journal bearings 41 for example, which extend through the aligned pairs of planet gear openings 49 to rotatably support the planet gears 38.

As noted above, the one-piece monolithic body 42 of the planet carrier 40 includes a number of center arms 50 which are integrally formed with, and interconnect, the carrier plates 48a, 48b and the torque transfer coupling 44. More particularly, each of the center arms 50 extends radially outwardly from the central tubular portion 43 of the torque transfer coupling 44 and the center arms 50 terminate, at their radially outermost ends 52, an integrally formed bridge 51 (see FIG. 3) extending axially between the spaced apart carrier plates 48a, 48b. The radially outer ends 52 of the center arms 50 therefore form the axially-extending bridge 51 between the carrier plates 48a, 48b (see FIG. 3). The outer ends 52 of the center arms 50 thus terminate at, and do not extend radially beyond, a radially outer perimeter 60 of the carrier plates 48a, 48b. This can be best seen in FIG. 4.

Figure 4:
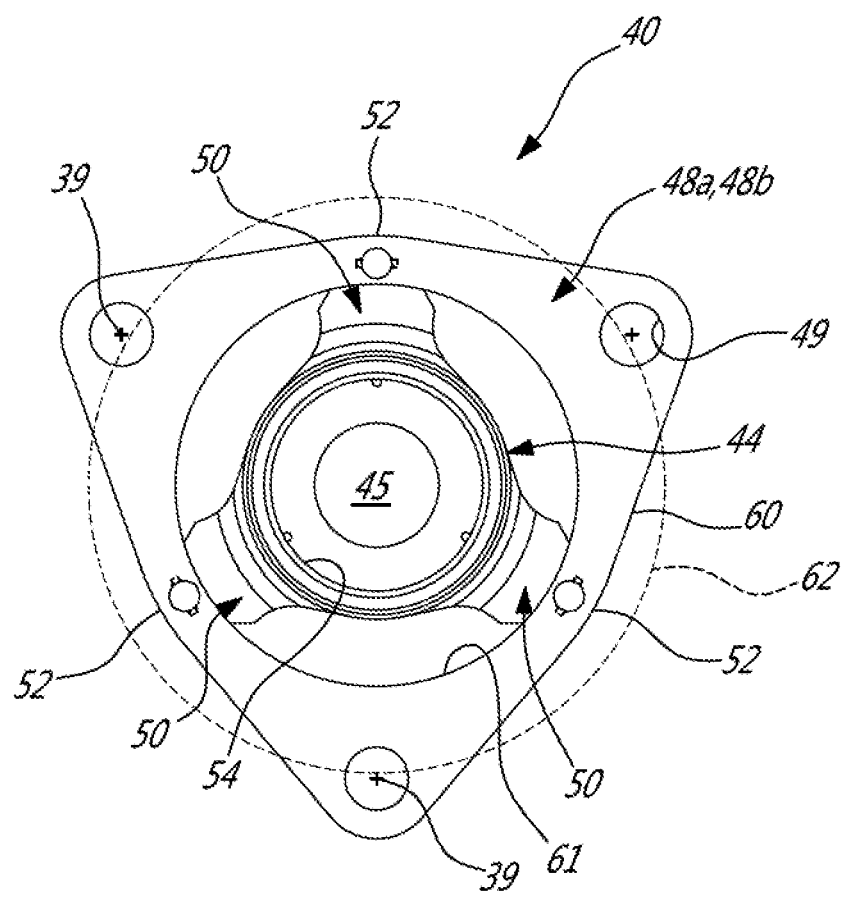
FIG. 4 is a front end elevational view of the plane carrier of the reduction stage of FIG. 2.

As also seen in FIG. 4, the carrier plates 48a, 48b also define a radially inner perimeter 61 which is radially spaced apart from the torque transfer coupling 44 that is disposed radially inwardly from this radially inner perimeter 61. Accordingly, given this radial gap between the centrally located torque transfer coupling 44 and the carrier plates 48a, 48b, the carrier plates do not connect with the torque transfer coupling 44 within each of the planes defined of the carrier plates, and only the axially centrally disposed center arms 50 connect the two carrier plates 48a, 48b to the torque transfer coupling 44. In the depicted embodiment, the radially inner perimeter 61 of the carrier plates is circular in shape.

Additionally, the integrally formed bridge 51 which forms the sole interconnection between the carrier plates 48a, 48b and the center arms 50, at the radially outermost ends 52 of the center arms 50, is radially disposed between the radially inner perimeter 61 and the radially outer perimeter 62 of the carrier plates 48a, 48b.

Referring still to FIG. 4, the center arms 50 are entirely radially disposed within the radially outer perimeter 60 formed by the carrier plates 48a, 48b. Further still, the center arms 50 may be entirely radially disposed within a diameter 62 formed by the axes of rotation 39 of the planet gears 38.

This results in a planet carrier 40 that is compact and lightweight, thereby reducing the space envelope required in the gearbox and reducing weight relative to many previous carrier designs. The planet carrier 40 therefore provides a relatively compact design, which may save weight without sacrificing durability. The compact nature of the planet carrier 40 and this configuration of the center arms 50 may permit a simplified torque path as discussed further below.

The center arms 50 of the planet carrier 40 define therethrough the torque path through which torque is transmitted during operation of the epicyclic gear train 27, which may permit a simplified torque path in comparison with other planet carrier designs.

The center arms 50 are centered axially between the carrier plates 48a, 48b supporting the planet gears 38, in order to distribute the load between both ends of the axles or bearings (e.g. the journal bearings 41) of the planet carrier 40. As such, the carrier plates 48a, 48b supporting the planet gears 38 are "decoupled" from the torque, which passes axially centrally and radially inwardly through monolithic body 42 of the planet carrier 40, from the carrier plates 48a, 48b to the central tubular portion 43 of the torque transfer coupling 44, via the center arms 50. The planet carrier 40 therefore provides balanced load distribution therethrough, and thus substantially uniform longitudinal load distribution on the journal bearing 41 and the gear teeth of the planet gears 38. This may permit gear optimization, and reduce the probability of bearing touch down or other durability issues.

The link between the carrier plates 48a, 48b and the torque transfer coupling 44 of the planet carrier 40 is therefore configured such that substantially limited relative twist between the upstream and downstream carrier plates 48a and 48b occurs. The carrier 40 is thus said to be "twist-controlled", wherein limited torsional deflection of the planet carrier 40 occurs, as the torque input is transferred directly to the output of the torque transfer coupling 44 via the internally disposed center arms 50. Thus, differential torsional load across the planet gear axles and/or journal bearings 41 is limited.

The center arms 50 of the monolithic body 42 transmit the torque from the carrier plates 48a, 48b, which rotate when the planet gears 38 are driven by the sun gear 32, to the radially inner torque transfer coupling 44, which in turn transmits this torque to the propeller shaft 29 providing output from the gearbox for driving the propeller of the gas turbine engine 10. In the depicted embodiment, the number of center arms 50 corresponds to the number of planet gears 38 (i.e. three center arms 50 and three planet gears 38), however the center arms 50 are circumferentially offset from the axes of rotation 39 of the planet gears 38. Accordingly, each center arm 50 is circumferentially disposed between two planet gears 38. The center arms 50 may be circumferentially equidistantly spaced apart, in this case by 120 degrees.

Figure 5:
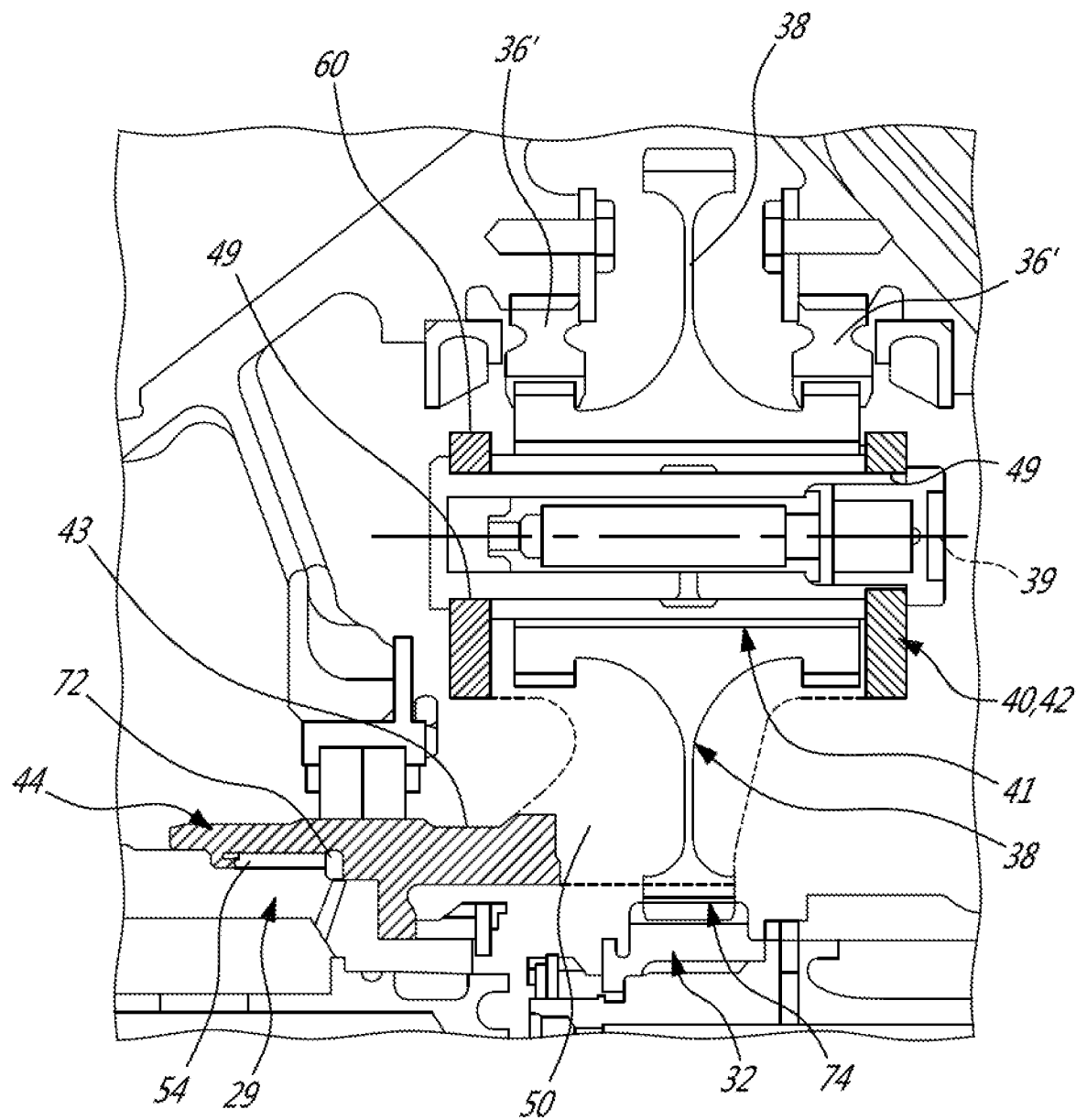
FIG. 5 is an enlarged, partial cross-sectional view of the epicyclic reduction stage of FIG. 2, taken from region 5 in FIG. 1.
Figure 6:
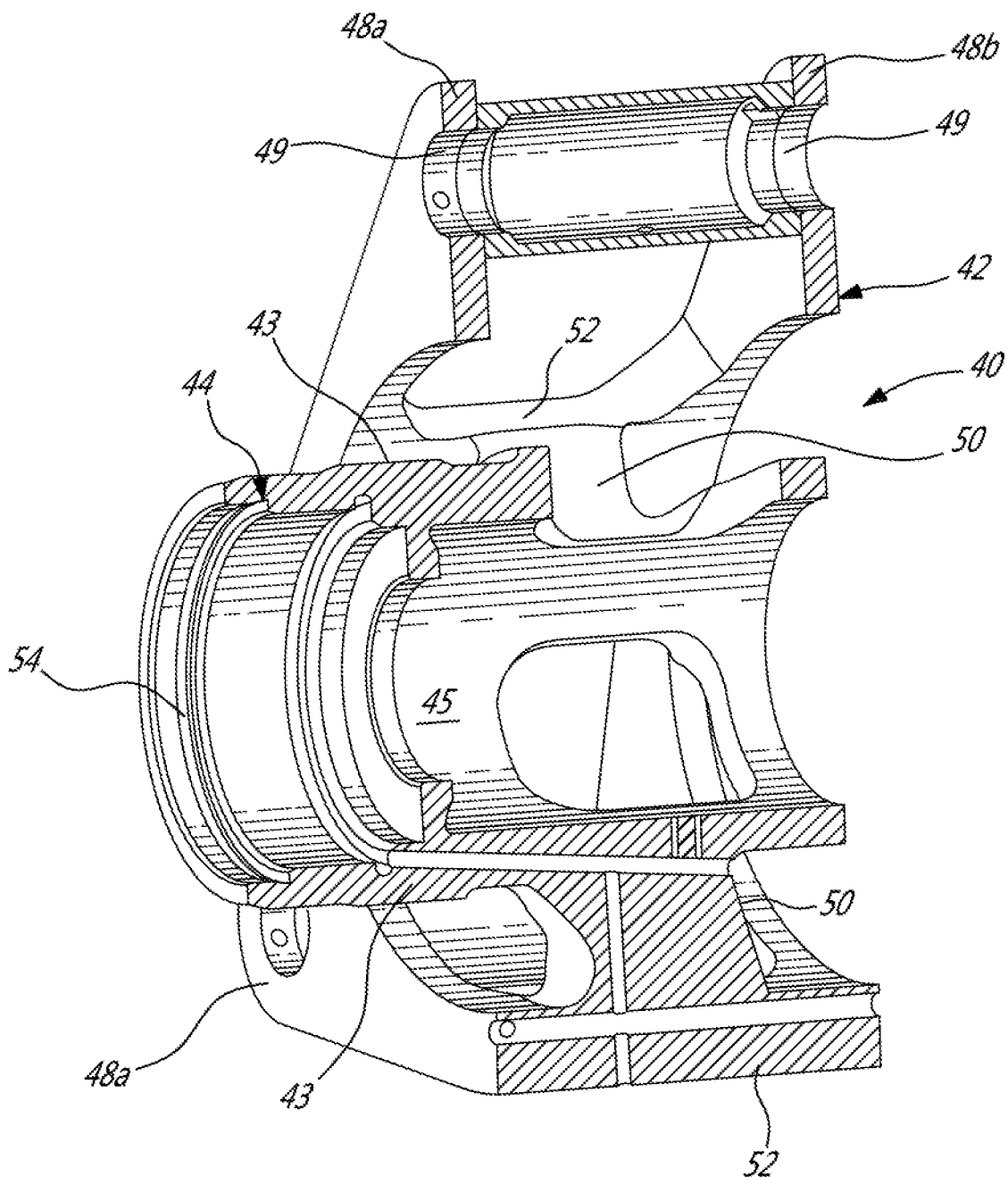
FIG. 6 is a partially sectioned perspective view of the planet carrier of the epicyclic reduction stage of FIG. 2.
Figure 7A:
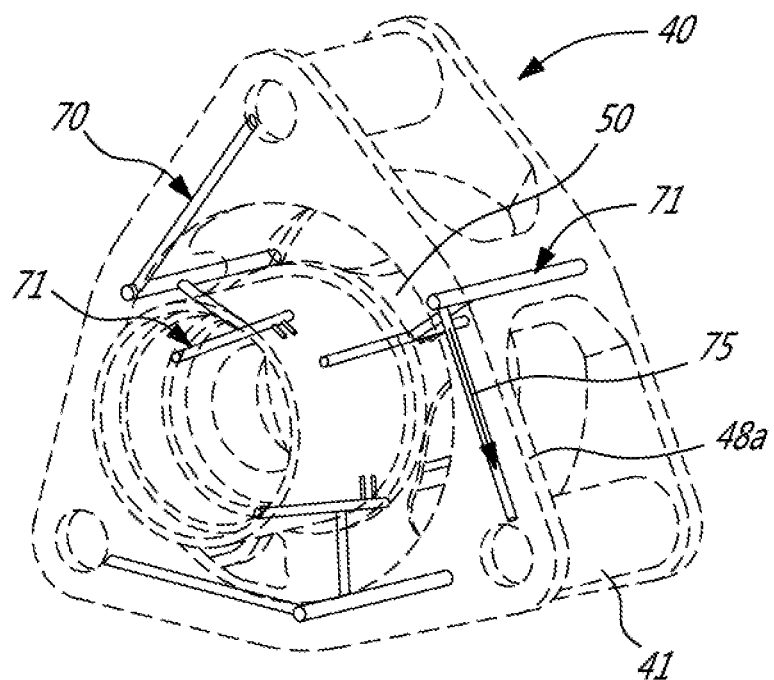
FIG. 7A is a perspective view of the planet carrier of the epicyclic reduction stage of FIG. 2, shown in partial transparency to show the oil feed circuit for the planet carrier.
Figure 7B:
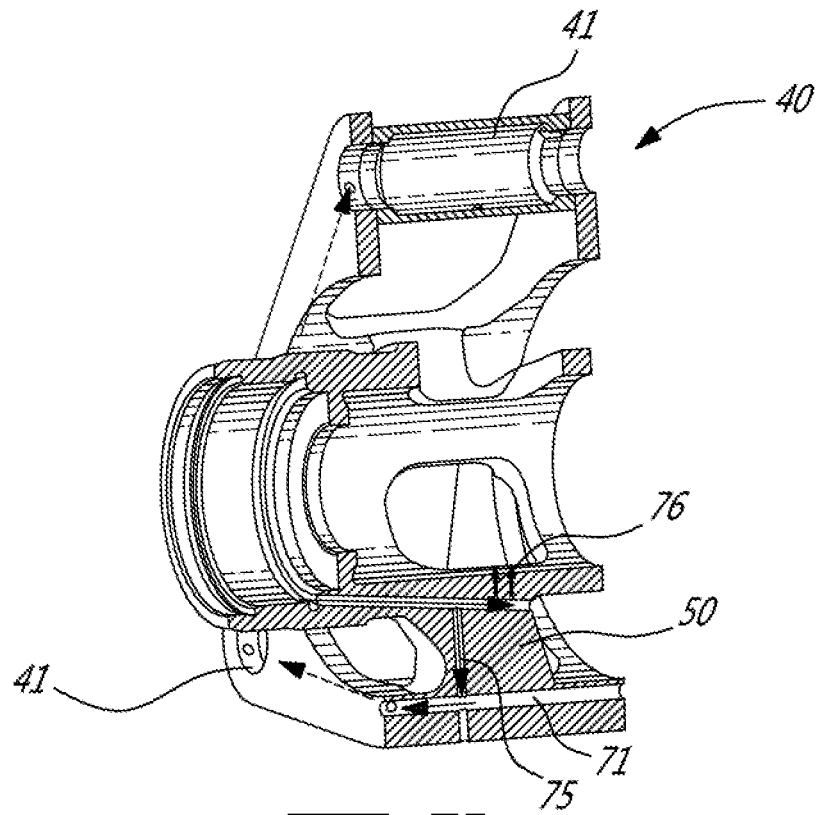
FIG. 7B is a partially sectioned perspective view of the planet carrier of FIG. 6A.

Referring now to FIGS. 7A-7B, with reference to FIG. 5, the planet carrier 40 may feature an oil gallery 70 of an oil feed circuit formed within the planet carrier 40 which is fed oil from an oil inlet 72 (see FIG. 5) and directs this oil within internal oil passages 71 within the body of the planet carrier. The oil inlet 72 is fed oil from an oil source external to the planet carrier 40 (e.g. within the gearbox 12 and/or the engine 10). These oil passages 71 are configured such as to direct the oil to the gearmesh 74 (see FIG. 5), between the central sun gear 32 and the planet gears 38, via gearmesh oil jets 76. Additionally, the oil passages 72 of the oil gallery 70 direct oil to the journal bearings 41 of the planet gears 38, via bearing oil passages 75 that extend through the central arms 50 of the planet carrier 50.

Figure 8A:
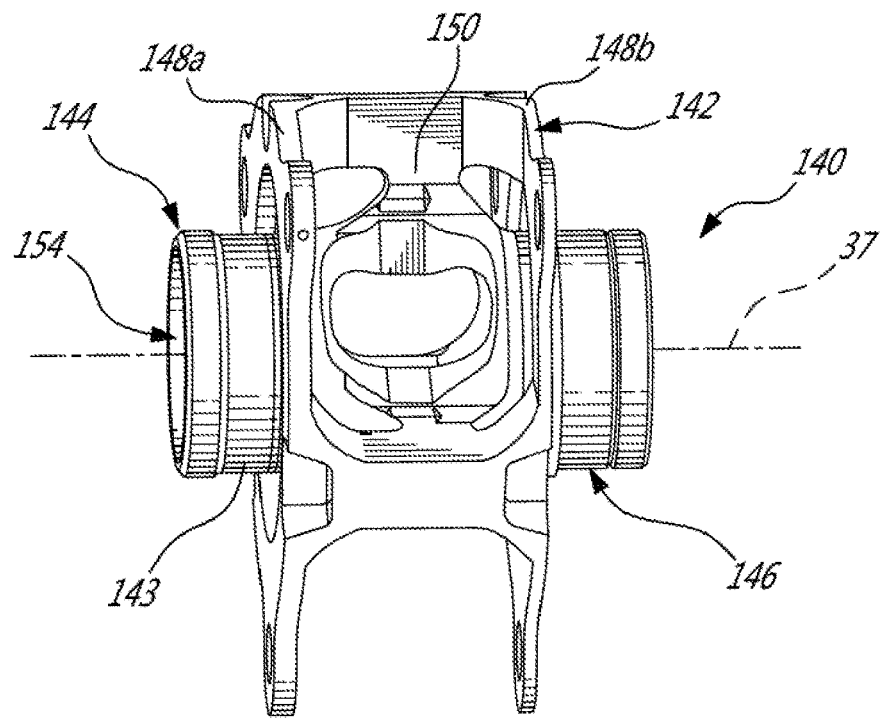
FIG. 8A is a perspective view of a compact planet carrier for an epicyclic reduction stage of a epicyclic gear train, in accordance with another embodiment of the present disclosure.
Figure 8B:
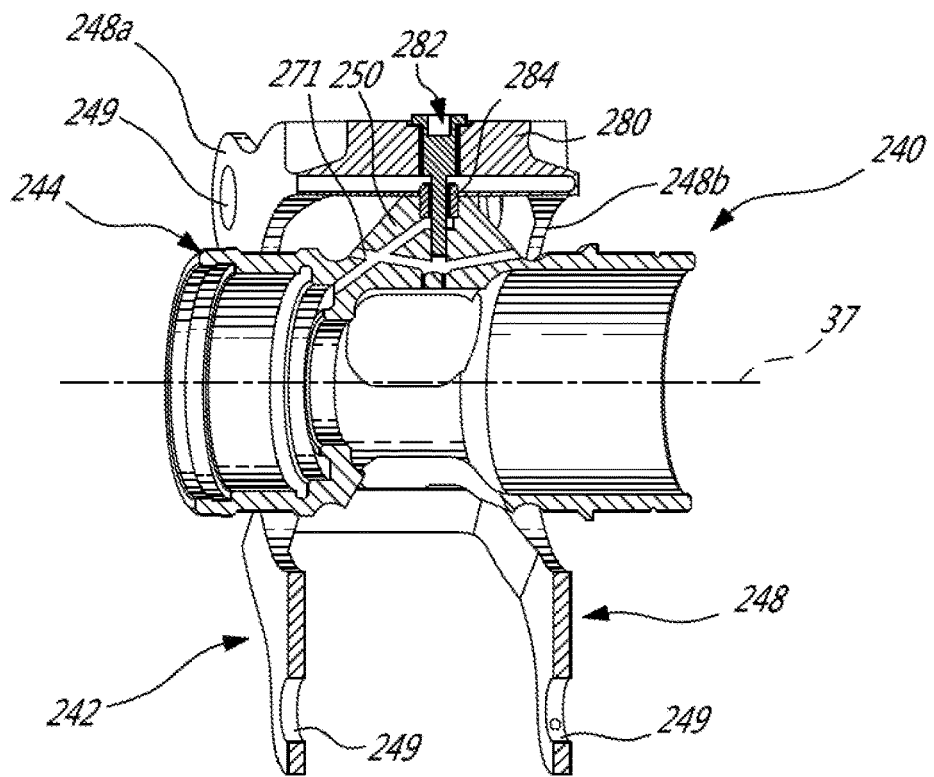
FIG. 8B is a partially sectioned perspective view of the plane carrier of FIG. 8A.

Referring now to FIGS. 8A-8B, alternate planet carriers 140 and 240 of the present disclosure will now be briefly described. The planet carriers 140 and 240 (of FIGS. 8A and 8B, respectively) are each similar to the planet carrier 40 as described above, however each of the planet carriers 140 and 240 has an alternate body configuration, as will now be described.

The planet carrier 140 of FIG. 8A includes a monolithic carrier body 142 having generally a central torque transfer coupling 144, a pair of carrier plates 148a, 148b that are separately formed from the central torque transfer coupling 144, and a number of radially extending and axially centered center arms 150 that interconnect the carrier plates 148a, 148b and the torque transfer coupling 144 and are integrally formed with both the torque transfer coupling 144 and carrier plates 148a, 148b to form a monolithic carrier body 142.

The forward end 154 of the central tubular portion 143 of the torque transfer coupling 144, i.e. closest to the forward end of the gear train, provides the interface with the propeller shaft 29 or the next reduction stage in a multi-stage RGB. Unlike the carrier 40, however, the alternate planet carrier 140 of FIG. 8A includes a rear bearing support 146 that extends axially rearwardly, concentrically with the longitudinal center axis 37 and thus with the central tubular portion 143 thereof. At the axially rear end of the central tubular portion 143 of the central torque transfer coupling 144, therefore, the rear bearing support 146 provides an axial extension that can be used to matingly engage and/or otherwise interface with a bearing which may be used, for example, for supporting the propeller shaft 29 at the rear side of the carrier 140.

Referring now to FIG. 8B, the planet carrier 240 has a carrier body 242 that is formed of two separately-formed parts (i.e. it is not a monolithic construction, as per the planet carriers 40 and 140 described above). Accordingly, the two-part carrier body 242 includes a gear carrier element 248 and a central torque transfer coupling 244 which are separately formed components fastened together using connecting bolts 282 and pins 284. The gear carrier element 248 includes two carrier plates 248a and 248b which may be formed as a single component and are thus interconnected by outer flanges 280 that axially extend between the axially separated carrier plates 248a, 248b.

The torque transfer coupling 244 includes radially extending center arms 250 which, much as per the planet carriers 40 and 140 described above, are axially centered between the carrier plates 248a and 248b, and circumferentially spaced apart about the carrier 240 such that each is circumferentially disposed between pairs of the planet gears mounted to the carrier plates 248a and 249b via the openings 249 therein. In the embodiment of FIG. 8B, the center arms 250 are integrally formed with the central torque transfer coupling 244. However, the center arms 250 in such a two-piece carrier configuration can alternately be integrally formed with the gear carrier element 248 instead. As can be seen in FIG. 8B, oil passages 271 of an internal oil gallery may be provided and extend through the center arms 250, in order to direct oil form an oil inlet point to the journal bearings supporting the planet gears and/or to the gear mesh points between the gears of the epicyclic reduction stage of the gear train.

The embodiments described above are intended to be exemplary only. For example, although embodiments having three planet gears are described, any suitable number of planet gears 38 can be employed. The planet carrier 40 and the epicyclic gear train 27 as described herein can be applicable to a gearbox and/or gear train having single reduction stage, a double reduction stage, or a gear train with more than two reduction stages. One skilled in the art will appreciate that the present gear train and gear box configuration described herein has application well beyond the gas turbine engine example described.

The invention claimed is:

1. An epicyclic gear train defining a longitudinal axis centrally extending therethrough, the epicyclic gear train comprising:
a central sun gear, an outer ring gear, and a number of planet gears which are mounted to a planet carrier for rotation about respective planet gear axes, the planet gears disposed in meshed engagement with the central sun gear and the outer ring gear; and
the planet carrier including a torque transfer coupling having a central bore concentric with the longitudinal axis and forming a torque transmission point on the planet carrier, a pair of carrier plates perpendicular to the longitudinal axis and axially spaced apart for supporting the planet gears therebetween, the central sun gear intersecting a mid-plane of the planet carrier, the mid-plane being axially centered between the carrier plates relative to the longitudinal axis, the planet carrier further including center arms extending radially outward from the torque transfer coupling to the carrier plates, the center arms transmitting torque between the torque transfer coupling and the carrier plates, the center arms being axially disposed between the carrier plates, and the center arms having radially outer ends which terminate at, and do not extend radially beyond, an outer perimeter of the carrier plates.

2. The epicyclic gear train as defined in claim 1, wherein the torque transfer coupling, the center arms and the carrier plates are integrally formed as a single-piece such that the planet carrier has a monolithic body.

3. The epicyclic gear train as defined in claim 1, wherein the carrier plates are connected to the torque transfer coupling only by the center arms.

4. The epicyclic gear train as defined in claim 1, wherein the carrier plates define a radially inner perimeter, the radially inner perimeter being radially spaced apart and outward from the torque transfer coupling.

5. The epicyclic gear train as defined in claim 4, wherein axially-extending bridges located at radially outermost ends of the center arms form the sole interconnection between the carrier plates and a remainder of the planet carrier.

6. The epicyclic gear train as defined in claim 5, wherein the axially extending bridges are radially located between the radially inner perimeter and the radially outer perimeter of the carrier plates.

7. The epicyclic gear train as defined in claim 4, wherein the radially inner perimeter of the carrier plates is circular in shape.

8. The epicyclic gear train as defined in claim 1, wherein the center arms are disposed at an axial midpoint between the carrier plates.

9. The epicyclic gear train as defined in claim 1, wherein the center arms are circumferentially equidistantly spaced about the planet carrier.

10. The epicyclic gear train as defined in claim 9, wherein the center arms are circumferentially offset from the planet gear axes.

11. The epicyclic gear train as defined in claim 10, wherein each of the center arms is circumferentially disposed between two planet gear axes.

12. The epicyclic gear train as defined in claim 1, wherein each of the carrier plates has a number of axle openings therein, the axle openings in opposed ones of the carrier plates being aligned with each other to receive axles of the planet gears therein, the planet gear axle openings defining the planet gear axes concentrically therein, and wherein the center arms of the planet carrier are entirely radially disposed within a diameter defined by the planet gear axes.

13. The epicyclic gear train as defined in claim 12, wherein the planet gear openings are circumferentially equidistantly spaced about the carrier plates of the planet carrier and are radially disposed a common distance relative to the longitudinal axis.

14. An epicyclic gear train having a longitudinal axis centrally extending therethrough, the epicyclic gear train comprising:
  a sun gear, an outer ring gear including two outer ring gear portions, and a number of planet gears which are mounted to a planet carrier and disposed radially between the sun gear and the outer ring gear in meshing engagement therewith, each of the planet gears including a central gear portion meshed with the sun gear and two lateral gear portions on opposite sides of the central gear portion and meshed with the two outer ring gear portions;
  the planet carrier including a torque transfer coupling centrally disposed concentrically with the longitudinal axis and two carrier plates disposed radially outward from the torque transfer coupling, the two carrier plates being axially spaced apart from each other and connected to the torque transfer coupling by center arms; and
  the center arms disposed axially midway between the carrier plates and radially extending away from the torque transfer coupling, the two carrier plates defining a radially outer perimeter enclosing a planar body of the carrier plates, the center arms having radially outer ends which terminate at the radially outer perimeter of the carrier plates such that the center arms are radially disposed entirely within the radially outer perimeter of the carrier plates.

15. The epicyclic gear train as defined in claim 14, wherein the torque transfer coupling, the center arms and the carrier plates being integrally formed as a single-piece to form a monolithic body of the planet carrier.

16. The epicyclic gear train as defined in claim 14, wherein each of the carrier plates has a number of axle openings therein, the axle openings in opposed ones of the carrier plates being aligned with each other for rotatably mounting the planet gears therein, the center arms being entirely radially disposed within a diameter defined by the axle openings each of the carrier plates.

17. The epicyclic gear train as defined in claim 14, wherein the carrier plates define a radially inner perimeter, the radially inner perimeter being radially spaced apart and outward from the central bore of the torque transfer coupling.

18. The epicyclic gear train as defined in claim 17, wherein radially outermost ends of the center arms form axially-extending bridges that interconnect the carrier plates with the center arms, the axially-extending bridges being radially located between the radially inner perimeter and the radially outer perimeter of the carrier plates.

19. The epicyclic gear train as defined in claim 16, wherein the center arms are circumferentially equidistantly spaced about the planet carrier and are circumferentially offset from the axle openings in the carrier plates.

20. A planet carrier adapted for use in an epicyclic gear train of a gas turbine engine, the epicyclic gear train defining a longitudinal axis centrally extending therethrough, the planet carrier comprising:
  a torque transfer coupling centrally disposed concentrically with the longitudinal axis; and
  carrier plates disposed radially outward from the torque transfer coupling, the carrier plates being axially spaced apart from each other and connected to the torque transfer coupling only by center arms, each of the carrier plates having axle openings therein defining planet gear axes;
  the center arms disposed axially between the carrier plates and radially extending away from the torque transfer coupling, the center arms having radially outer ends which terminate at a radially outer perimeter of the carrier plates such that the center arms are entirely radially disposed within the radially outer perimeter of the carrier plates, the center arms disposed entirely radially within a diameter defined by the planet gear axes.

\* \* \* \* \*